United States Patent
Rowlett et al.

(10) Patent No.: US 6,966,270 B2
(45) Date of Patent: Nov. 22, 2005

(54) SEEDING TOOL

(75) Inventors: Don C. Rowlett, Bedford, PA (US); Linus I. Yeager, St. Brieux (CA); Dean M. Bigelow, St. Brieux (CA)

(73) Assignees: Kennametal Inc., Latrobe, PA (US); F. P. Bourgault Tillage Tools Ltd., Saskatchewan (CA)

( * ) Notice: Subject to any disclaimer, the term of this patent is extended or adjusted under 35 U.S.C. 154(b) by 0 days.

(21) Appl. No.: 10/666,270

(22) Filed: Sep. 19, 2003

(65) Prior Publication Data

US 2005/0072583 A1 Apr. 7, 2005

(51) Int. Cl.[7] .......................... A01C 7/00; A01C 9/00; A01C 23/00
(52) U.S. Cl. ...................... 111/123; 111/188
(58) Field of Search .............. 111/186–188, 170, 111/174, 175, 118–120, 123–126, 127–129; 172/721–733

(56) References Cited

U.S. PATENT DOCUMENTS

| | | | |
|---|---|---|---|
| 4,655,296 A | 4/1987 | Bourgault et al. | |
| 4,762,183 A | 8/1988 | Bourgault et al. | |
| 4,993,499 A | 2/1991 | Bourgault et al. | |
| 5,029,757 A | 7/1991 | Bourgault et al. | |
| 5,062,572 A | 11/1991 | Reiter et al. | |
| 5,251,704 A | 10/1993 | Bourgault et al. | |
| 5,355,963 A | 10/1994 | Boyko et al. | |
| 5,357,884 A | 10/1994 | Bourgault | |
| 5,431,232 A | 7/1995 | Kirsch | |
| D374,018 S | 9/1996 | Schemenauer et al. | |
| 5,592,889 A | 1/1997 | Bourgault | |
| 5,660,237 A | 8/1997 | Boyko et al. | |
| 5,711,378 A | 1/1998 | Yeager | |
| 6,024,179 A | 2/2000 | Bourgault | |
| 6,042,326 A | 3/2000 | Thomas et al. | |
| 6,216,616 B1 | 4/2001 | Bourgault | |
| 6,237,697 B1 | 5/2001 | Butterfield et al. | |
| 6,260,632 B1 | 7/2001 | Bourgault et al. | |
| 6,363,871 B1 | 4/2002 | Puetz et al. | |
| 6,571,884 B1 | 6/2003 | Horvath et al. | |
| 6,584,920 B1 | 7/2003 | Cresswell | |

OTHER PUBLICATIONS

D. W. Carman et al., "Constraints and Approaches for Distributed Sensor Network Security," NAI Labs Technical Report #00-010, Sep. 1, 2000, pp. 1-127.

*Primary Examiner*—Christopher J. Novosad
(74) *Attorney, Agent, or Firm*—Matthew W. Smith (57) ABSTRACT

A seeding tool for depositing seeds and fertilizer within a furrow including a knife opener having a liquid wing projecting from the side thereof for providing and maintaining spacing between the seeds and fertilizer. Preferably, the liquid wing is a tungsten carbide insert secured to the side of the knife opener, and has a wing shaped structure which is shaped and sized to space the fertilizer apart from the seeds, to protect the end of the tube from which fertilizer is dispensed, and to present a small leading surface which displaces the soil easily and presents minimal resistance. Preferably, the largest, side surface of the liquid wing insert is inclined toward the side of the knife opener from a widest lower, rear member adjacent the end of the fertilizer tube to a narrower top, front member near a leading end of the knife opener.

36 Claims, 8 Drawing Sheets

SEEDING TOOL

BACKGROUND OF THE INVENTION

1. Field of the Invention

The present invention relates to a seeding tool, including a liquid wing member that facilitates single pass planting and fertilizing of seeds. The liquid wing insert of the present invention includes a tungsten carbide insert rigidly attached to a knife opener of the seeding tool. The liquid wing insert can be brazed or glued to the knife opener and can provide increased wear life of the knife opener.

2. Description of the Background Art

The agricultural industry is employing larger and more efficient single pass planting systems for minimal tillage planting. Such systems can employ a seeding tool having a removable knife opener, which breaks the soil and creates a generally v-shaped trough into which seeds are dispensed. The knife opener can include integral or attachable members which can facilitate the concurrent dispensing of the seeds at the proper depth and the fertilizer at the proper distance from the seeds. To properly deposit seeds and fertilizer at the same time can require special care in handling and dispensing to ensure that the fertilizer is spaced an appropriate distance away from the seeds. Dispensing the fertilizer such that it comes into contact with or is deposited too close to the seeds can result in the fertilizer damaging and/or destroying the seeds.

In conventional practice, the liquid wing is an integrally cast, outwardly projecting wing-shaped member of the knife opener casting. The conventional practice is also to thereafter coat the liquid wing member with a wear resistant material, such as KT-150, available commercially from Kennametal Inc., by a process referred to as "hard-facing." The primary purposes of the liquid wing member are to maintain critical separation between the seeds and the fertilizer and to protect the end of a tube from which the fertilizer is dispensed. The liquid wing member can be designed to assure consistent depth placement of the fertilizer, even in wheel tracks, to prolong the life of the liquid fertilizer tube, and to prevent plugging of the liquid fertilizer tube in/heavy soils.

The conventional liquid wing member is generally a narrow triangular shaped protrusion which projects outward from a side of the knife opener. The hypotenuse of the triangular shaped member is adjacent the side of the knife opener and the longer of the two other side forms the leading edge with the third side thereof being the trailing edge. The leading edge begins generally flush with the side face of the knife opener. The side of the leading edge then gradually slopes out away from the side of the knife opener to a maximum outwardly projecting distance. The trailing edge slopes back towards and terminates against the side face of the knife opener a certain distance from the frontal member thereof, thus forming the shape of a "wing," for which it is named. The end of a small, typically metal, tube through which the fertilizer is dispensed, terminates behind the liquid wing. The end of the tube projects slightly outwards from the side of the knife opener, but is protected by the triangular shaped liquid wing member during use.

The tip of the knife opener creates a generally v-shaped trough into which the seeds are deposited, and the liquid wing creates a second trough out to the side of the knife opener, a predetermined distance above and to the side of the v-shaped trough created by the tip. The conventional shape and angle of the liquid wing protrusion is designed to provide the desired separation between the seeds and the fertilizer and protect the fertilizer tube opening.

Some disadvantages of the conventional liquid wing protrusion can include an undesirably short wear life, difficulty in repairing when worn, and less than optimum shape characteristics resulting from the hard-facing process. Even the hard-facing of the integrally cast liquid wing member can be insufficient to provide the desired wear resistance. When the liquid wing has become worn, the knife opener must typically be rebuilt from weld material or replaced with a new knife opener with integrally cast liquid wing. Consequently, when the liquid wing wears, it is necessary to remove the knife opener from service until it can be rebuilt or replaced with a new knife opener. The more frequently the wing protrusion must be rebuilt or replaced, the more often the knife opener must be removed, placed out of service, and then rebuilt or replaced before it can be returned to service. If the knife opener is utilized with an overly worn wing protrusion, problems will almost certainly occur, including deposition of the fertilizer too close to the seeds, thus destroying or damaging the seeds, and rapid wear and frequent plugging of the fertilizer tube.

The conventional way to rebuild the liquid wing on the side of the knife opener is by depositing hard facing or welding material on the side of the knife opener to rebuild the wing shaped protrusion, which can be a difficult and time consuming process. This type of repair can also result in a shape which can be even less desirable than the original post hard-faced liquid wing member. As explained, the initial hard-facing process involves plating the newly cast integral liquid wing member with a hard, wear resistant material. However, this hard-facing process can also result in a blurring of the original cast shape of the liquid wing, making the final shape of the liquid wing less than desirable. Reconstituting a worn liquid wing member by laying down weldment can result in an even less optimal shape.

Therefore, it would be desirable to both limit the frequency with which the liquid wing protrusion wears down, and provide a more efficient manner of repairing a worn liquid wing, thus reducing the amount of time that the knife opener is out of service. According to the present invention, this can be accomplished by forming the liquid wing of tungsten carbide, i.e., a liquid wing insert.

SUMMARY OF THE INVENTION

The present invention provides a seeding tool, and particularly a single-pass seeding tool which can concurrently dispense seeds and fertilizer into a generally v-shaped furrow created by the seeding tool, wherein the fertilizer is maintained a critical distance from the seeds. The seeding tool comprises a rear frame member, a front knife opener, associated seed and fertilizer dispensing members, and a liquid wing insert affixed to the side of the knife opener. The liquid wing insert can provide and maintain critical separation between the seed and the fertilizer, and also protect the end of the fertilizer tube from wear and becoming plugged with soil.

The knife opener includes a narrow top including furrowing tip, opposite side faces and a bottom. A tungsten carbide tip can be secured to the furrowing tip of the knife opener. The fertilizer dispensing member can be a tube which extends through the rear frame member towards the bottom of the knife opener. The end of the fertilizer tube can terminate outward from, and generally perpendicular to, one side of the knife opener. The knife opener can have a liquid wing insert according to the present invention affixed on the side thereof proximate the end of the fertilizer tube. The liquid wing insert is positioned forward of the fertilizer tube and can have a shape which, when affixed to the side of the knife opener, projects sufficiently outward from the side thereof to protect the end of the fertilizer tube.

The liquid wing insert can preferably be made from tungsten carbide, or a ceramic material and the size and shape thereof can be designed to perform several functions. For example, the liquid wing insert must extend from the side of the knife opener sufficiently to both shield the end of the fertilizer tube from the soil and to create and maintain critical spacing between the seeds and the fertilizer. The shape of the liquid wing insert can also be designed with aerodynamic considerations in mind, such as to provide minimal resistance while the insert is drawn through the soil on the side of the knife opener.

Another embodiment of the invention can comprise a seeding tool having a raised boss on the knife opener member whereon a tungsten carbide liquid wing insert is mounted. The raised mounting surface can be an integrally cast member of the tip member and can also have a shape generally corresponding to the shape of the liquid wing insert. In a further embodiment, the side and/or bottom of the knife opener, and/or the mounting surface can have a channel which can receive and position the fertilizer tube adjacent the liquid wing insert.

A further embodiment of invention can comprise a modular single pass seed planting system having an elongated tool bar supported for movement by a plurality of wheels and which is adapted to be towed in a given forward direction by a power source such as that provided by a tractor. Attached to the tool bar are a plurality of single pass seeding tools mounted along the length of the tool bar. Each single pass seeding tool can dispense seeds and fertilizer into a generally v-shaped furrow created by the seeding tool. Each seeding tool can comprise a rear frame member which can be attached to the tool bar, a front knife opener, associated seed and fertilizer dispensing members, and a tungsten carbide liquid wing insert affixed to the side of the knife opener.

DESCRIPTION OF THE PREFERRED EMBODIMENTS

Figure 1:
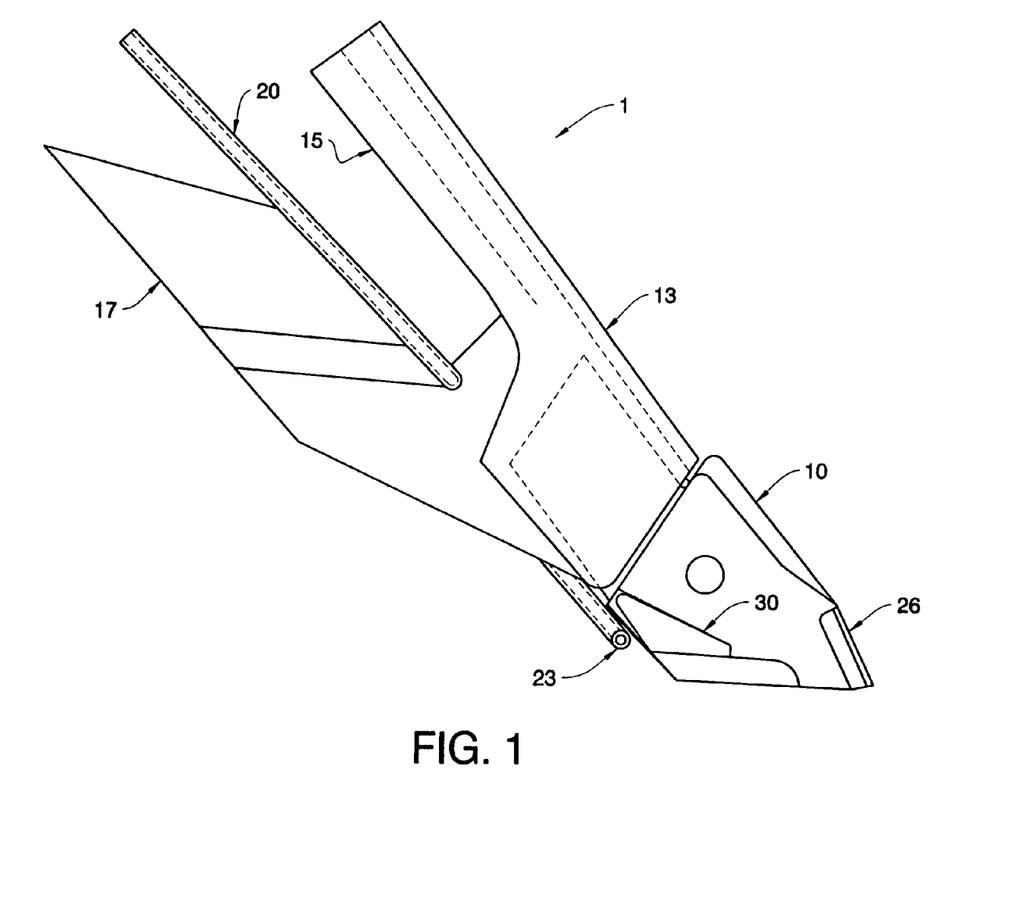
FIG. 1 is a side view of an embodiment of a seeding tool according to the invention.
Figure 2:
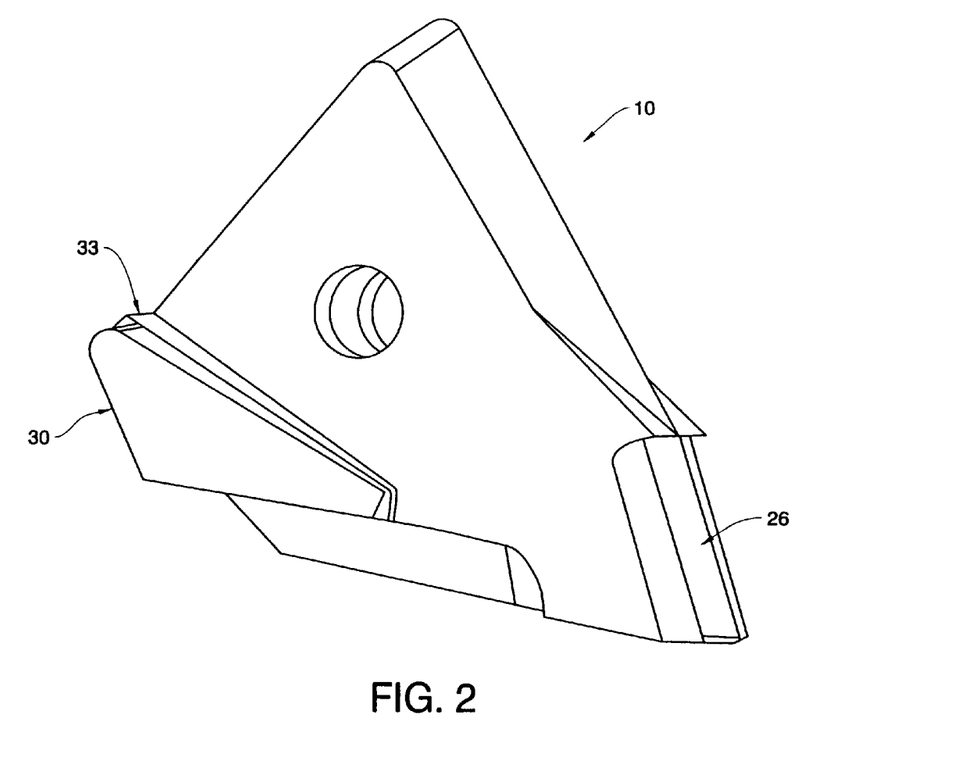
FIG. 2 is a perspective view of a tip member of the seeding tool in FIG. 1.
Figure 3:
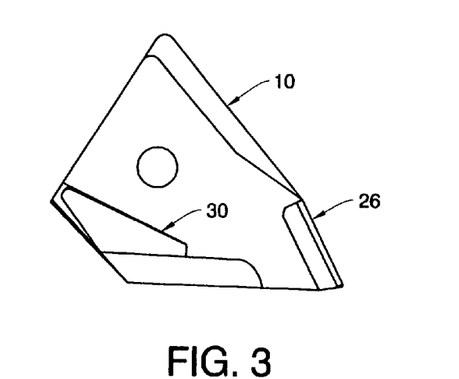
FIG. 3 is a side view of the tip member in FIG. 2.
Figure 19:
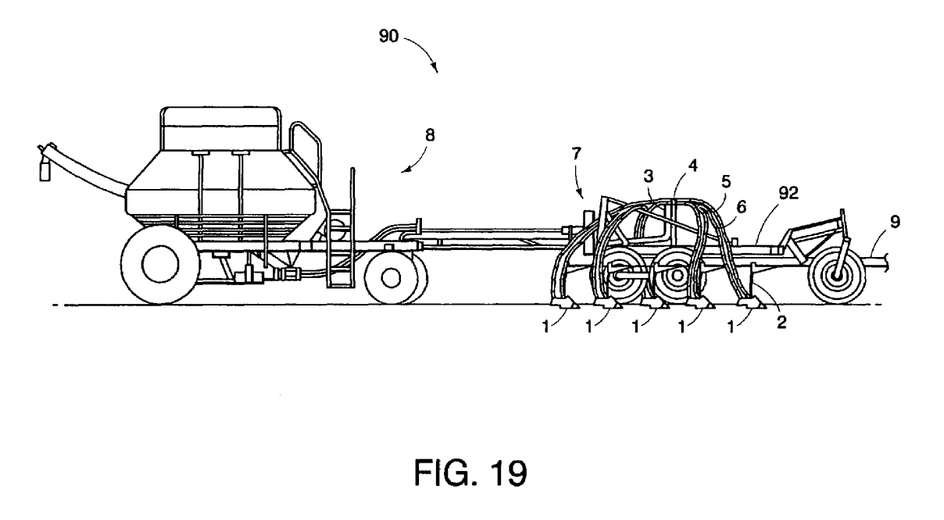
FIG. 19 is a side view of an embodiment of a planting system according to the present invention.

Referring now to the drawings, which are for purposes of illustrating the invention only, and not for purposes of limiting the same, a seeding tool 1 is shown in FIG. 1 having a removable knife opener 10 and a tungsten carbide liquid wing insert 30 affixed to the side thereof. The seeding tool 1 can be one component of a modular seed planting system 90, as shown in FIG. 19. The seed planting system 90 can include a seeding tool, such as the seeding tool 1 (FIG. 1), having a frame member 13 for securing to a shank 2. A plurality of seeding tools 1 and shanks 2 can typically be attached to a tillage implement 7 having one or more tool bars 92. As shown, a plurality of seeding tools 1 can be attached to spaced apart locations on each toolbar 92. The spaced arrangement is selected to allow the best passage of field trash between adjacent seeding tools 1, yet minimize soil ridging. For example, but not limited to, the seeding tools 1 can be spaced transversely to each other or in a side by side relationship relative to each other. Three to five toolbars 92 can typically be utilized, depending on the spacing desired between planted rows.

The tillage implement 7 can include a hitch 9 for attachment to a power source such as, for example, a tractor or the like for pulling the implement 7 across a field. A product cart 8 and nurse tank (not shown) can be towed behind the tillage implement 7, or alternately between the tractor and tillage implement 7. The nurse tank and product cart 8 can deliver seed and fertilizer through distribution headers 3, 4 and distribution lines 5, 6 to the seeding tools 1 for deposition in the soil. As used herein the term fertilizer refers to a liquid or a solid form fertilizer as appropriate.

It will be appreciated that the maintenance of the separation between the seeds and the fertilizer is critical to maintain seedling viability. The relative seed and fertilizer placements also position the fertilizer at a distance where the plant roots are likely to intercept it. If the separation is compromised, varying degrees of seedling germination damage can occur. In situations where high rates of nutrients are in direct contact with germinating seeds, there is a high probability of seedling mortality.

As the liquid wing 30 wears, it becomes smaller and seed separation from the fertilizer is reduced and the risk of seedling injury increases. When the liquid wing 30 becomes overly worn, there will be unacceptably minimal separation between seed and fertilizer, wearing down of the end of the fertilizer tube by the soil, and soil may also plug the end of the fertilizer tube.

As shown in FIG. 1, the seeding tool 1 comprises a lower member commonly referred to as a knife opener 10 secured to a frame member 13. The frame member 13 can have an upper member 15 configured for attachment to the shank 2 of the tillage implement 7 described above in connection with the seed planting system 90 shown in FIG. 19. The frame member 13 can also have a lower member 17 designed to accommodate a seed dispensing member (not shown), and a fertilizer tube 20 can be provided which, as illustrated, can extend through the seeding tool 1 between the upper 15 and lower 17 members of the frame member 13. The end 23 of the fertilizer tube 20, from which fertilizer is dispensed, can terminate just behind and adjacent to a side of the knife opener 10.

The knife opener 10 member may be made by casting from austempered ductile iron, chrome iron, and the like, or otherwise formed as individually connected steel parts. Preferably, the knife opener 10 is a high chrome casting. The tip of the knife opener 10 can be integrally cast of the same material, but can preferably be a tungsten carbide insert rigidly secured to the knife opener 10. In the embodiment of seeding tool 1 illustrated, the knife opener member 10 can be removably attached to the frame member 13. This type of seeding tool 1 is of a design commercially available from F.P. Bourgault Tillage Tools, Ltd., of Saskatchewan, Canada. The configuration of the seeding tool 1 is generally accepted and used over a wide area of the great plains of North America. It will be appreciated that within this geographic region many different soil types occur. The present invention is primarily concerned with soil that can be characterized as having highly abrasive properties. These types of soils significantly reduce the wear life members of the seeding tool 1, and particularly members of the knife opener 10 component thereof, such as the tip 26 and the liquid wing 30. Such increased wear correspondingly increases the maintenance costs and downtime as previously described.

According to the invention, the liquid wing 30 is preferably a tungsten carbide wing insert which is rigidly secured to the side of the knife opener 10 adjacent to and in front of the end 23 of the fertilizer tube 20. The tungsten carbide liquid wing insert 30 can be secured to the side of the knife opener 10 by employing any method well known in the art which assures a strong attachment. Preferably the wing insert 30 is attached using a brazing process well known by those skilled in the art. Alternatively, appropriate adhesives could also be used to effect securement of the wing insert 30 to the side of the knife opener 10. In a further embodiment of the invention, the liquid wing insert 30 is preferably mounted on a raised boss 33 provided on the side of the knife opener 10, as shown best in FIGS. 4 and 5. The raised boss 33 can have a shape which is complimentary to the shape of the liquid wing insert 30.

The liquid wing insert 30 of the present invention generally has a complex, multifaceted structure, the multiple surfaces of which are best viewed in FIGS. 7 through 13. In general, the liquid wing insert 30 is generally of a shape designed to enhance material flow over and around the outer surfaces of the wing insert 30 and to reduce susceptibility to breakage of the wing insert 30 from impacts with hard obstructions and the like which may be encountered in the soil.

Figure 6:
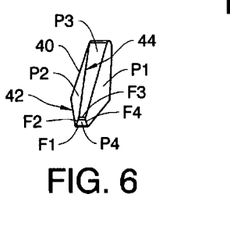
FIG. 6 is a perspective view of an embodiment of a liquid wing insert according to the invention.

A perspective view of a presently preferred embodiment of the tungsten carbide liquid wing insert 30 is shown in FIG. 6. Multiple views of the liquid wing insert 30, taken at various angles, are provided in FIGS. 7–13 to better show all of the different surfaces of the multi-faceted structure of the liquid wing insert 30.

The liquid wing insert 30 of the present invention comprises six different surfaces, or planes, which are labeled P1, P2, P3, P4, P5, and P6. These six surfaces are referred to hereinafter as the base P1, the side face P2, the top face P3, the front face P4, the lower face P5, and the rear face P6. As illustrated, each face has four sides, and for ease of reference thereto, each side is labeled i1 through i4, wherein i is the letter corresponding to the first letter of the name given to each face, as denoted above.

The liquid wing insert 30 can have an overall width $W_O$ which is designed to provide a certain degree of outward projection of the insert from the side of the knife opener 10. In a preferred embodiment, $W_O$ can be from about 0.50 to about 1.5 inches, measured from the side of the knife opener 10 to the farthest out point on the side face P2. However, this dimension can depend on whether the base P1 of the liquid wing insert 30 is mounted flush on the side of the knife opener 10, or on a raised boss 33 provided on the side of the knife opener 10. Thus, instead of making the liquid wing insert 30 large enough to extend outward from the side of the knife opener 10 the full desired distance, the raised boss 33 can be provided on the side of the knife opener 10, and the wing insert 30 mounted thereon.

Figure 4:
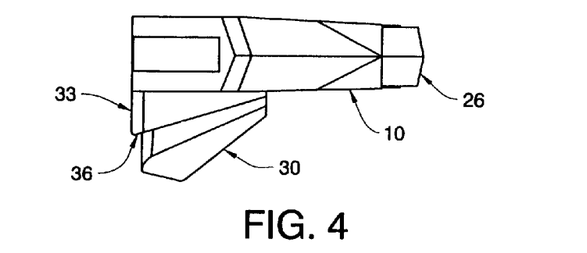
FIG. 4 is a top view of the tip member in FIG. 2.
Figure 5:
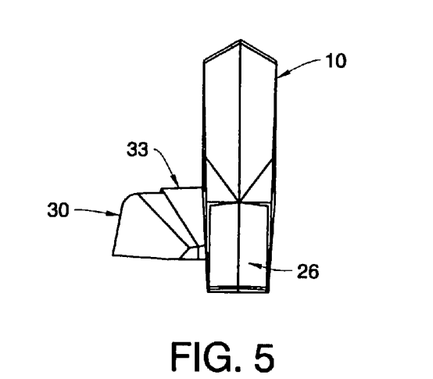
FIG. 5 is a front view of the tip member in FIG. 2.

In a preferred embodiment, the raised boss 33 can have a shape roughly corresponding to the shape of the base P1 of the liquid wing insert 30. The raised boss 33 can have a substantially planar mounting surface 36 on which the base P1 of the liquid wing insert 30 is affixed. Although substantially planar, the mounting surface 36 can be at an angle, in one or more planes, to the side of the knife opener 10. Essentially, the raised boss 33 can function like a lower extension of the liquid wing insert 30, except that it is cast as part of the knife opener 10 so that the liquid wing insert 30 can be smaller. In a preferred embodiment of the invention, the raised boss 33 can have an outwardly most projecting width of about 0.350 inch from the side of the knife opener 10. This permits the liquid wing insert 30 to have a reduced total outward projecting width $W_O$ by generally the same 0.350 inch. Thus, the wing insert 30 can be made smaller, and less expensively, yet still provide the desired durability and ease of interchangeability. More importantly, this can be done without noticeably compromising the wear life of the liquid wing 30 because it is the outer liquid wing insert 30 which endures essentially all of the abrasion with the soil. As can be seen in FIGS. 4 and 5, only the relatively narrow width, i.e., the top and front surfaces, of the raised boss 33 which are not shielded by the insert will suffer any contact at all with the soil.

Figure 7:
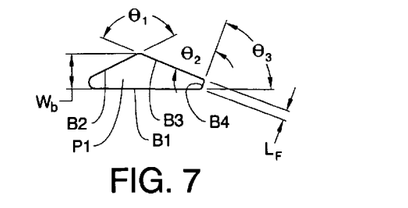
FIG. 7 is a front view of the base of the liquid wing insert shown in FIG. 6.

Referring more particularly to FIG. 7, the base P1 of the liquid wing insert 30 is shown being a substantially flat, planar surface. The base P1 has four sides, labeled B1, B2, B3, and B4. The base P1 has a generally triangular appearance, but is not a true triangle because one apex is actually a small fourth side, i.e., B4, forming a trapezoidal shape. In a simplest embodiment, the base P1 of the liquid wing insert 30 could be affixed directly to the side of the knife opener 10. However, in a presently preferred embodiment of the invention, the base P1 is affixed to the mounting surface 36 of the raised boss 33 provided on the side of the knife opener 10, as shown best in FIGS. 4 and 5. As explained previously, the raised boss 33 can be provided on the side of the knife opener 10 to reduce the size of the tungsten carbide liquid wing insert 30.

In a preferred embodiment of the insert, the width $W_b$ of the base P1 is about 0.546 inch. Some other preferred dimensional features of the liquid wing insert 30 particularly associated with the base P1 are labeled in FIG. 7, including the height $L_F$ of side B4, and angles $\theta_1$, $\theta_2$, $\theta_3$, and $\theta_4$. These dimensions can have certain values which result in a presently preferred shape of the liquid wing insert 30. For example, in a preferred embodiment $L_F$ is about 0.158 inch, $\theta_1$ is about 131 degrees, $\theta_2$ is about 90 degrees, $\theta_3$ is about 68 degrees, and $\theta_4$ is about 41.5 degrees. Additionally, a small radius, for example 0.03 inch, is provided at the intersection of each side except B1 and B2, at which intersection a relatively larger radius is provided, for example 0.10 inch.

Figure 8:
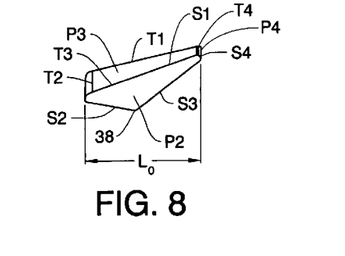
FIGS. 8 through 13 are views of the liquid wing insert shown in FIG. 6 taken at various different angles to illustrate the different surfaces.
Figure 9:
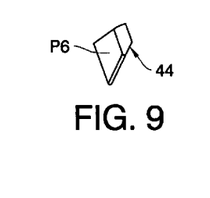
Figure 10:
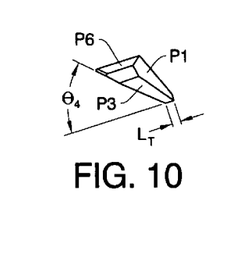
Figure 11:
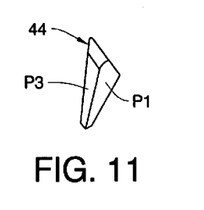

As seen best in FIG. 8, the side face P2 is the largest surface on the wing insert 30. The side face P2 has a generally triangular appearance, but also has four sides, labeled S1, S2, S3, and S4. However, similarly to the base P1, sides S1 and S3 of the side face P2, terminate at the small fourth side S4, instead of forming an apex of a triangle. Also similarly to the base P1, a relatively large radius, such as 0.10 inch, is provided at the intersection of sides S1 and S2. The intersection of sides S2 and S3 of the side face P2 define outward most projecting point 38 of the wing insert 30 from the side of the knife opener 10. The edge 40 formed by the intersection of side S2 with side R4 of the rear face P6 and the edge 42 formed by the intersection of side S3 with side L2 of the lower face P5 can each be chamfered. These edges 40, 42 endure a large amount of contact with the soil, and are the edges of the liquid wing insert 30 most susceptible to damage from contact with the soil, and perhaps rocks or trash in the soil. The chamfers can prevent chipping of the edges 40, 42 in case of contact with hard objects such as the aforementioned like rocks and hard trash objects. Additionally, for manufacturing reasons, a small "ramp" 44 can be provided at the edge formed by the intersection of side S1 with side T3 of the top face P3. The ramp 44 is actually concave, outward opening radius at the intersection of those two sides. In a preferred embodiment, the radius can be about 0.03 inch.

The plane formed by the side face P2 is at a compound angle to the side of the knife opener 10, e.g., is angled relative to the side of the knife opener 10 in two different planes. In particular, the liquid wing insert 30 tapers from front to back, from a narrower leading front face P4 to a wider trailing rear face P6. The liquid wing insert 30 additionally tapers from top to bottom, from narrower at the top face P3 to wider at the lower face P5. Specifically, the side face P2 angles out away from the side of the knife opener 10 from front to back, as if rotated CW clockwise about the short front side S4, which also corresponds to side F2 of the front face P4. The side face P2 also angles out away from the side of the knife opener 10 from bottom to top, as if rotated CW clockwise about the longest side S1 of the side face P2, which also corresponds to side T3 of the top face P3.

The side face P2 is the largest surface on the wing insert 30, and is also the surface which endures the most abrasion with the soil as the liquid wing insert 30 is carried through the soil on the side of the knife opener 10. The side face P2 is the surface of the insert which pushes the soil out away from the side of the knife opener 10 to both shield the end of the fertilizer tube and to create and maintain the critical spacing between the fertilizer and the seeds. In a preferred embodiment of the liquid wing insert 30, the side face P2 has an overall length $L_O$ of about 1.735 inches. The end 23 of the fertilizer tube 20 terminates behind the rear face P6 of the wing insert 30, towards the lower part thereof, and just above the lower face P5, and also extends outward from the side of the knife opener 10, terminating just short of the plane formed by the side face P2.

The compound angle of the side face P2 can be provided for purposes of minimizing the resistance as the liquid wing insert 30 cuts through the soil as it is carried by the knife opener 10. For example, both the lower face P5 and the rear face P6 are wider near the lower, rear member of the wing insert 30, i.e., where the lower P5 and rear P6 faces intersect. This is, by design, also where the end 23 of the fertilizer tube 20 and projects out away from the side of the knife opener 10, terminating just short of the side face P2. Although the width of the liquid wing insert 30 is designed to provide the desired amount of spacing between the fertilizer and the seed, and to protect the end 23 of the fertilizer tube 20, the wing insert 30 is widest only were it needs to be, i.e., where the end 23 of the fertilizer tube 20 terminates. From that widest point of the wing insert 30, the side face P2 of the liquid wing insert 30 inclines inwardly at gradually sloping angles toward the side of the knife opener 10 and toward the leading end of the knife opener 10. This design creates a small leading member, i.e., the front P4 and top P3 faces, which presents minimal resistance and displaces the soil easily. Minimizing the resistance not only reduces the wear on the liquid wing insert 30, but also reduces the amount of force required to move the seeding tool through the soil. As explained previously, multiple seeding tools can be utilized, each having a knife opener 10 with a liquid wing insert 30. As a result, reducing the resistance at each liquid wing insert 30 can cumulatively provide a not insignificant overall reduction in the amount of force needed to furrow the soil.

The top face P3, shown best in FIGS. 6 and 8, extends along the top of the wing insert 30 adjacent the side of the knife opener 10. In a preferred embodiment, the top face P3 can be generally perpendicular to the plane formed by the base P1. The top face P3 is a relatively long and narrow surface defined by sides T1, T2, T3, and T4. The top face P3 gradually widens from a narrower forward-most side T4 to a wider rear-most side T2. The intersection of side T2 with side R4 of the rear face P6 can have a relatively large radius, such as 0.10 inch. The intersection of side T4 with side F3 of the front face P4 can likewise be radiused, but the radius is preferably much smaller, such as 0.03 inch. In a preferred embodiment the length $L_F$ of side T4 is about 0.124 inch.

As best viewed in FIG. 6, the front face P4 is the leading member of the wing insert 30, and is a trapezoidal surface defined by sides F1, F2, F3, and F4. The plane formed by the front face P4 is angled slightly rearward relative to the side of the knife opener 10 (forming an acute angle therewith), and also slightly forward, i.e. in the direction of travel of the knife opener 10, relative to the lower face P5 (forming an obtuse angle therewith). The upper side F3 and lower side F1 are each radiused, minimally, such as a 0.03 inch radius, where each side F3, F1 intersects with sides T4 and L3, respectively, of the top P3 and lower P5 faces of the wing insert 30. In a preferred embodiment, the plane formed by the front face P4 is about 90 degrees relative to the plane formed by the top face P3, and is angled about 112 degrees relative to the plane formed by the lower face P5. The front face P4 is further angled about 75.4 degrees to the plane formed by the base P1. In a preferred embodiment, the length $L_F$ of side F4 is about 0.158 inch. The small front face P4 (and narrow top face P3) present minimal impedance as the knife opener 10 carries the wing insert 30 through the soil.

Figure 12:
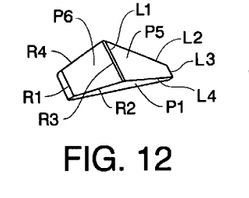
Figure 13:
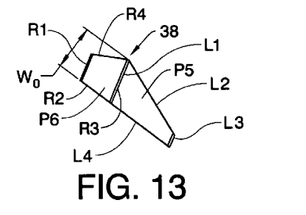

Referring to FIGS. 12 and 13, the lower face P5 of the insert is shown best, and is defined by four sides L1, L2, L3 and L4. Like the other surfaces of the liquid wing insert 30, the lower face P5 is also trapezoidal shaped, having two longer sides L2 and L4 extending from the a wider side L1 and converging at a shorter side L3. Preferably, the liquid wing insert 30 is designed such that when the base P1 is secured to the side of the knife opener 10, the plane formed by the lower face P5 is oriented generally angled with respect to the ground at a 2° taper from the front to the rear of opener 10 when the knife opener 10 is in operation. In this manner, the amount of resistance to the soil imparted by the wing insert 30 is primarily a function of the size and shape of the side face P2, and, to a lesser extent, the top P3 and front P4 faces.

The rear face P6 can also be seen best in FIGS. 12 and 13, being shown as a four sided trapezoidal surface defined by sides R1, R2, R3, and R4. The end 23 of the fertilizer tube 20 terminates behind the rear face P6, and projects slightly outward from the side of the knife opener 10, but to a distance less than that which the rear face P6 projects. The rear face P6 is the surface which primarily protects the end of the fertilizer tube from contact with the soil, which would wear down or plug the end 23 of the tube 20. In a preferred embodiment, the intersection of side R1 and side T2 of the top face P3 has a relatively large radius, such as, for example, but not limited to, 0.10 inch. Most preferably, the rear face P6 is angled $\theta_1$ relative to the plane formed by the lower face P5 at about 131 degrees.

In a preferred embodiment of this invention, the liquid wing insert is formed of tungsten carbide and has a shape generally corresponding to, but somewhat different from the conventional cast protrusion. The liquid wing insert can be comprised of about 10 percent or higher cobalt grade of tungsten carbide or can be a ceramic material. Preferably, the liquid wing insert can be made from K3520™ carbide composition commercially available from Kennametal Inc., Latrobe, Pa.

Figure 14:
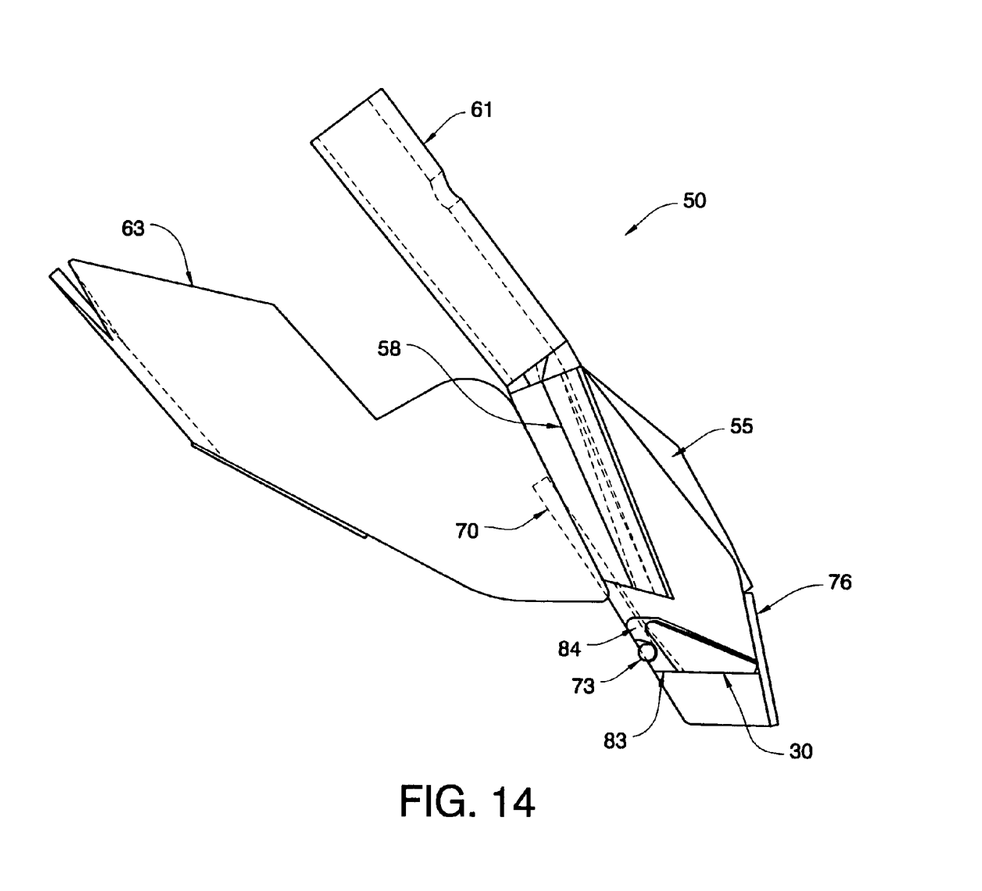
FIG. 14 is a side view of another embodiment of a seeding tool according to the invention.
Figure 15:
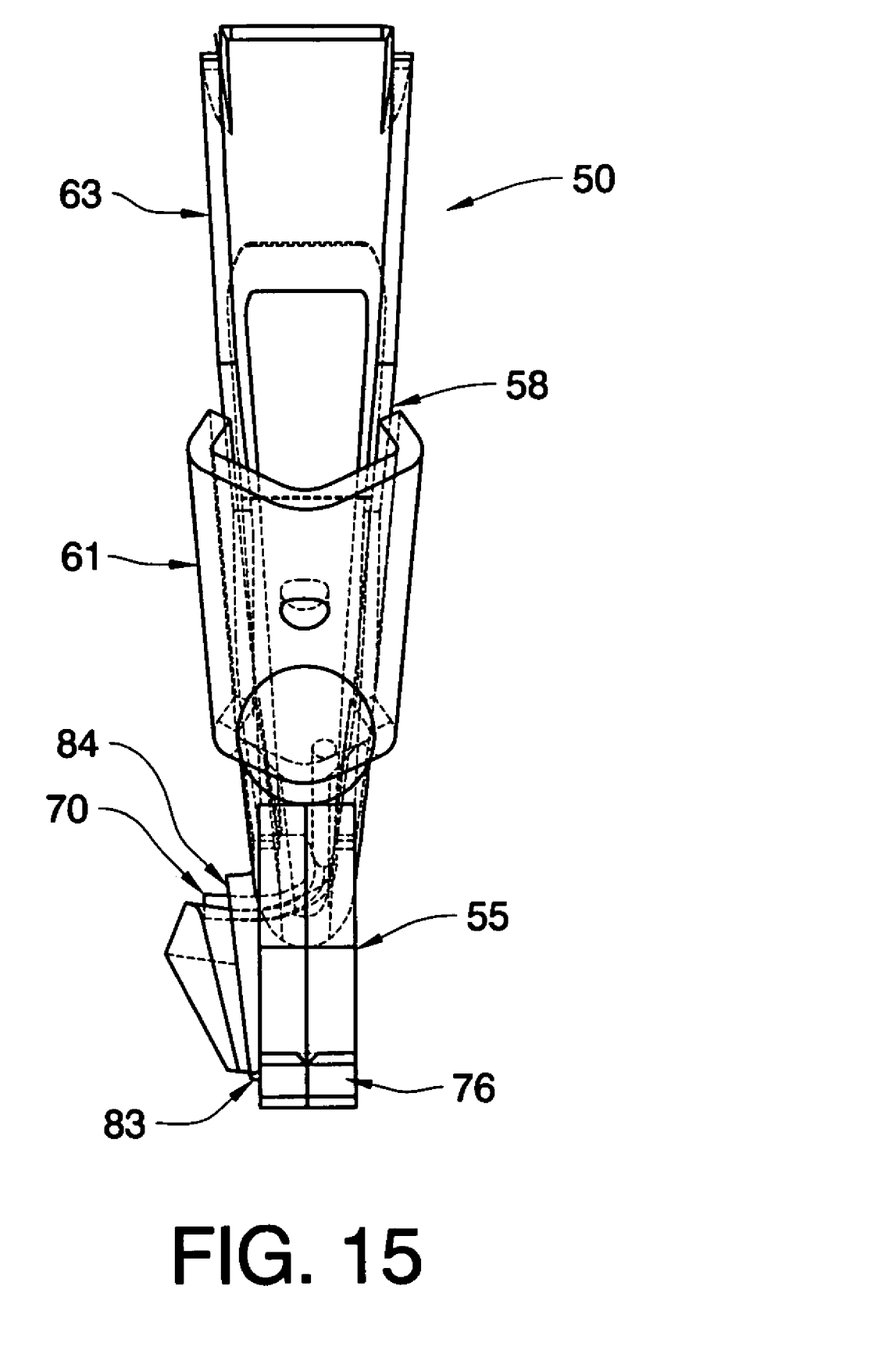
FIG. 15 is a top view of the seeding tool in FIG. 14.

Referring now to FIGS. 14 and 15, there is illustrated a further embodiment of a seeding tool 50 having similar features as the seeding tool 1 shown in FIG. 1. The seeding tool 50 has a lower knife opener member 55 connected to a frame member 58. In this embodiment of the seeding tool 50, the knife opener 55 can be essentially permanently attached to the frame member 58, such as by welding. In other respects, the seeding tool can be similar to the seeding tool 1 in FIG. 1, including having upper 61 and lower 63 members of the frame member 58 and a fertilizer tube 70 extending therebetween down toward the knife opener member 55. Additionally, a seed dispensing member can be attached adjacent the lower frame member 63. The end 73 of the fertilizer tube 70 can similarly terminate just outward from the side of the knife opener 50. The knife opener also has a tip 76, which can be a tungsten carbide insert, and a liquid wing insert 30, which is as described previously in FIGS. 6 through 13. The liquid wing insert 30 is likewise rigidly secured to the side of the knife opener by, such as, for example, but not limited to, brazing or gluing. The end 73 of the fertilizer tube 70 terminates just behind the rear face P5 of the liquid wing insert 30 as described previously. As in the embodiment of the seeding tool 1, the liquid wing performs the same functions of creating and maintaining critical separation and spacing between the seeds and the fertilizer.

Figure 16:
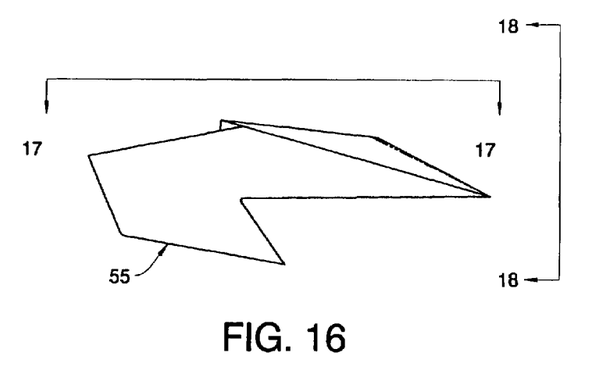
FIG. 16 is a side view of only a tip member of the seeding tool in FIG. 14.
Figure 17:
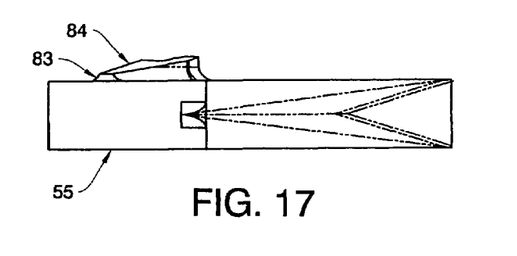
FIG. 17 is a view taken along line XVII—XVII in FIG. 16.
Figure 18:
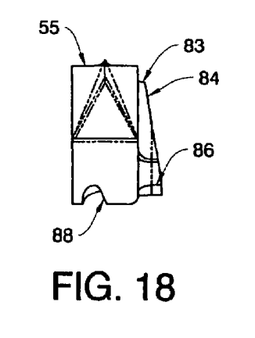
FIG. 18 is a view taken along line XVIII—XVIII in FIG. 16.

The knife opener member 55 of the seeding tool 50 is illustrated in more detail in FIGS. 16–18, which illustrates differences between the knife opener 55 and the knife opener 10 of the seeding tool 1. In particular, a raised boss 83 can also be providing with a mounting surface 84 on which to mount the liquid wing insert 30. However, this raised boss 83 can be provided with a channel 86 formed therein which receives and locates a lower member of the fertilizer tube 70. Additionally, the bottom of the knife opener 10 itself can also be provided with a similar channel 88, which aligns with the channel 86, to further position and locate the lower member of the fertilizer tube 70. In all other respects, the general shape of the raised boss 83 and the liquid wing insert 30 can be similarly shaped, and for the same reasons, as described previously in connection with the seeding tool 1.

While the invention has been specifically described in connection with certain specific embodiments thereof, it is to be understood that this is by way of illustration and not of limitation. Therefore, the scope of the appended claims should be construed as broadly as the background art will permit. It will be evident to those skilled in the art that numerous variations of the details of the present invention may be made without departing from the invention as defined in the appended claims.

What is claimed is:

1. A seeding tool for dispensing seeds and fertilizer into a furrow in soil created by the seeding tool, said seeding tool comprising:
    a knife opener having a tip at a leading end thereof for creating a furrow;
    a liquid wing insert on a side of said knife opener to provide spacing between said seeds and fertilizer;
    said liquid wing insert being a multi-faceted structure having (i) a base mounted on said side of said knife opener, and (ii) a side face spaced apart from said base;
    said side face of said liquid wing insert having a lower rearward member defining a maximum outward-most member of said liquid wing insert from said side of said knife opener; and
    said side face of said liquid wing insert oriented at a compound angle relative to said side of said knife opener such that from said outward-most member said side face inclines inwardly both toward said side and toward said leading end of said knife opener to create a leading member of said liquid wing insert which displaces soil.

2. The seeding tool of claim 1 wherein said multi-faceted structure of said liquid wing insert further comprises a six faced structure, and wherein front, top, rear, and lower faces extend between said base and said side face to form said six faced structure.

3. The seeding tool of claim 2 wherein each of said six faces is comprised of four sides.

4. The seeding tool of claim 2 further comprising two edges of said insert formed by an intersection of two sides of said side face with one side of each of said rear and lower faces, said two edges intersecting at a point, said point being said outward-most member of said insert, and at least one of said two edges being chamfered to prevent chipping thereof.

5. The seeding tool of claim 4 further comprising said point being spaced from said side of said knife opener from about 0.5 to about 1.5 inches.

6. The seeding tool of claim 2 further comprising an intersection of a longest side of said side face and a side of said top face provided with a concave outwardly opening radius.

7. The seeding tool of claim 2 further comprising each of said top and lower faces tapering from a wider trailing end of said insert to a narrower leading end of said insert.

8. The seeding tool of claim 1 further comprising a raised boss provided on the side of the knife opener and said base mounted on said raised boss.

9. The seeding tool of claim 8 further comprising said raised boss having substantially planar mounting surface on which said base is mounted.

10. The seeding tool of claim 8 further comprising said mounting surface oriented at compound angle to said side of knife opener.

11. The seeding tool of claim 8 further comprising said raised boss having a shape generally corresponding to the shape of said base such that said raised boss is generally a lower extension of said liquid wing insert.

12. The seeding tool of claim 8 further comprising said raised boss having a channel therein, said channel sized to receive a fertilizer dispensing tube member.

13. The seeding tool of claim 12 further comprising a bottom surface of said knife opener adjacent said raised boss having a second channel therein which is generally aligned with said channel in said raised boss.

14. A modular seed planting system comprising an elongated tool bar supported for movement by a plurality of wheels and which is adapted to be towed in a given forward direction by a power, and attached to the tool bar are a plurality of seeding tools mounted along the length thereof, and wherein each seeding tool comprises:
   a knife opener having a tip at a leading end thereof for creating a furrow;
   a liquid wing insert on a side of said knife opener to provide spacing between said seeds and fertilizer;
   said liquid wing insert being a multi-faceted structure having (i) a base mounted on said side of said knife opener and (ii) a side face spaced apart from said base;
   said side face of said liquid wing insert having a lower rearward member defining a maximum outward-most member of said liquid wing insert from said side of said knife opener; and
   said side face of said liquid wing insert oriented at a compound angle relative to said side of said knife opener such that from said outward-most member said side face inclines inwardly both toward said side and toward said leading end of said knife opener to create a leading member of said liquid wing insert which displaces soil.

15. The modular seed planting system of claim 14 wherein said multi-faceted structure comprises a six faced structured, and wherein front, top, rear, and lower faces extend between said base and said side face to form said six faced structure.

16. The modular seed planting system of claim 15 wherein each of said six faces is comprised of four sides.

17. The modular seed planting system of claim 15 further comprising two edges of said insert formed by an intersection of two sides of said side face with one side of each of said rear and lower faces, said two edges intersecting at a point, said point being said outward-most member of said insert, and at least one of said two edges being chamfered to prevent chipping thereof.

18. The modular seed planting system of claim 17 further comprising said point being spaced from said side of said knife opener from about 0.5 to about 1.5 inches.

19. The modular seed planting system of claim 15 further comprising an intersection of a longest side of said side face and a side of said top face provided with a concave outwardly opening radius.

20. The modular seed planting system of claim 15 further comprising each of said top and lower faces tapering from a wider side at a trailing end of said insert to a narrower side at a leading end of said insert.

21. The modular seed planting system of claim 14 further comprising a raised boss provided on the side of the knife opener and said base removably mounted on said raised boss.

22. The modular seed planting system of claim 21 further comprising said raised boss having substantially planar mounting surface on which said base is removably mounted.

23. The modular seed planting system of claim 21 further comprising said mounting surface oriented at compound angle to said side of knife opener.

24. The modular seed planting system of claim 21 further comprising said raised boss having a shape generally corresponding to the shape of said base such that said raised boss is generally a lower extension of said liquid wing insert.

25. The modular seed planting system of claim 21 further comprising said raised boss having a channel therein, said channel sized to receive a fertilizer dispensing tube member.

26. The modular seed planting system of claim 25 further comprising a bottom surface of said knife opener adjacent said raised boss having a second channel therein which is generally aligned with said channel in said raised boss.

27. A liquid wing insert for a knife opener of a seeding tool to provide spacing between seeds and fertilizer which are dispensed by the seeding tool, said liquid wing insert comprising:
   a multi-faceted structure having (i) a base mounted on a side of said knife opener, and (ii) a side face spaced apart from said base;
   said side face of said liquid wing insert having a lower rearward member defining a maximum outward-most member of said liquid wing insert from said side of said knife opener; and
   said side face of said liquid wing insert oriented at a compound angle relative to said side of said knife opener such that from said outward-most member said side face inclines inwardly both toward said side and toward a leading end of said knife opener to create a leading member of said liquid wing insert which displaces soil.

28. The liquid wing insert of claim 27 wherein said multi-faceted structure comprises a six faced structured, and wherein front, top, rear, and lower faces extend between said base and said side face to form said six faced structure.

29. The liquid wing insert of claim 28 wherein each of said six faces is comprised of four sides.

30. The liquid wing insert of claim 28 further comprising two edges of said insert formed by an intersection of two sides of said side face with one side of each of said rear and lower faces, said two edges intersecting at a point, said point being said outward-most member of said insert, and at least one of said two edges being chamfered to prevent chipping thereof.

31. The liquid wing insert of claim 30 further comprising said point being spaced from said side of said knife opener from about 0.5 to about 1.5 inches.

32. The liquid wing insert of claim 27 further comprising an intersection of a longest side of said side face and a side of said top face provided with a concave outwardly opening radius.

33. The liquid wing insert of claim 27 further comprising each of said top and lower faces tapering from a wider side at a trailing end of said insert to a narrower side at a leading end of said insert.

34. The liquid wing insert of claim 27 wherein said liquid wing insert is comprised of a tungsten carbide.

35. The liquid wing insert of claim 34 wherein said liquid wing insert is further comprised of a 10 percent or greater cobalt grade of tungsten carbide.

36. The liquid wing insert of claim 27 wherein said liquid wing insert is comprised of a ceramic material.

* * * * *